United States Patent Office 3,544,537
Patented Dec. 1, 1970

3,544,537
POLY(PERFLUOROALKOXY)POLYFLUOROAL-KYL ACRYLATE-TYPE ESTERS AND THEIR POLYMERS
Neal O. Brace, Wheaton, Ill., assignor to E. I. du Pont de Nemours and Company, Wilmington, Del., a corporation of Delaware
No Drawing. Filed May 31, 1968, Ser. No. 733,271
Int. Cl. C08f 3/64, 3/66
U.S. Cl. 260—89.5                                    5 Claims

ABSTRACT OF THE DISCLOSURE

Esters of the formula $$R_fO[CF(CF_3)CF_2O]_nCF(CF_3)CH_2O_2CCR=CH_2$$

wherein $R_f$ is perfluoroalkyl, R is hydrogen or methyl and $n$ is an integer of 0–2. Homopolymers of the above esters; and copolymers of the above esters with at least one polymerizable vinylidene monomer free of non-vinylic fluorine, in which units derived from the ester are present in an amount of at least 25% by weight. Polymeric mixtures of a polymer defined in the preceding sentence and a polymer of at least one polymerizable vinylidene monomer free of non-vinylic fluorine, in which the mixture contains at least 3% by weight of polymer units derived from the esters of the first paragraph above. Textiles treated with the polymers and polymeric mixtures defined above.

BACKGROUND OF THE INVENTION

Field of the invention

This invention relates to acrylate-type esters of poly-(perfluoroalkoxy)polyfluoroalkanols, their polymers and compositions containing their polymers.

Description of the prior art

Poly(perfluoroalkoxy)polyfluoroalkanols are described in U.S. Pat. 3,293,306 and are stated to be useful in preparing esters such as the phosphate di-esters described therein. However, carboxylate esters, especially ones derived from an unsaturated carboxylic acid, have not been prepared heretofore. It is an object of this invention to prepare such esters and to prepare polymers and polymeric compositions derived from them. These and other objects will become apparent hereinafter.

SUMMARY OF THE INVENTION

This invention is directed to polymerizable ester monomers of the structural formula $$R_fO[CF(CF_3)CF_2O]_nCF(CF_3)CH_2O_2CCR=CH_2$$

wherein $R_f$ is perfluoroalkyl of 1 through 6 carbon atoms, R is hydrogen or methyl, and $n$ is an integer of zero through two.

The invention is also directed to polymers of the monomers defined above, including homopolymers and copolymers with vinylidene monomers free of non-vinylic fluorine. These polymers can be defined as polymers containing from about 25% to 100% by weight units derived from the monomers of this invention and from 0% to about 75% by weight units derived from at least one vinylidene monomer free of non-vinylic fluorine.

The invention is further directed to polymeric mixtures containing a polymer described in the preceding paragraph and a polymer of at least one vinylidene monomer free of non-vinylic fluorine, in which the mixture contains at least 3% by weight units derived from the monomers of this invention.

The invention also includes the application of the polymers and the polymeric mixtures of this invention to textiles.

DESCRIPTION OF THE INVENTION

The ester monomers of this invention are ultimately derived from hexafluoropropylene by the following steps: oxidation of hexafluoropropylene to hexafluoropropylene oxide, polymerization of the oxide to acid fluorides of the structure $$R_fO[CF(CF_3)CF_2O]_nCF(CF_3)COF$$

reduction of these acid fluorides to the alcohols $$R_fO[CF(CF_3)CF_2O]_nCF(CF_3)CH_2OH$$

and finally esterification of the alcohols to form the esters $$R_fO[CF(CF_3)CF_2O]_nCF(CF_3)CH_2O_2CCR=CH_2$$

Oxidation of hexafluoropropylene to the corresponding epoxide is readily carried out in several ways, for example:
(1) With alkaline hydrogen peroxide as disclosed by Eleuterio and Meschke in U.S. Pat. 3,358,003;
(2) reaction with oxygen under the influence of light or a halogen (Gibbs & Warnell, Canadian Pat. 691,974, British specification 931,587, or French Pat. 1,322,597);
(3) reaction with oxygen under pressure, French 1,416,-957, British specification 1,034,492; or (4) reaction with oxygen in the presence of oxygen difluoride, (Weinmayr, U.S.S.N. 293,899, filed July 9, 1963).

Polymerization of the hexafluoropropylene oxide to the acid fluoride $$R_fO[CF(CF_3)CF_2O]_nCF(CF_3)COF$$

may be carried out in the presence of activated charcoal or certain inorganic fluorides such as cesium fluoride. If the epoxide alone is used, the products have $R_f$ as $CF_3CF_2CF_2$, Warnell, 3,125,599; Moore & Milian & Eleuterio, U.S. Patent 3,250,808; Moore, British Specification 1,033,574 or French Patent 1,359,426. The epoxides may also be polymerized in the presence of carbonyl fluoride to give the products $$CF_3O[CF(CF_3)CF_2O]_nCF(CF_3)COF$$

(U.S. 3,250,808, and French Pat. 1,362,548) or other perfluoroacid fluorides such as $R_fCOF$ to give $$R_fCF_2O[CF(CF_3)CF_2O]_nCF(CF_3)COF$$

(U.S. 3,250,808, French 1,362,548). Polymerization of the epoxide in the presence of perfluoroketones gives the products $$(R_f)_2CFO[CF(CF_3)CF_2O]_nCF(CF_3)COF$$

or in the presence of perfluorocyclic ketones to give the products

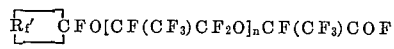

wherein $R_f'$ is a 3–8 carbon perfluoroalkylene (Selman, Canadian Patent 707,363). The epoxides may also be polymerized in the presence of alkali metal salts of perfluoro-tertiary-alcohols, e.g., $(R_f)_3COCs$, to give the products $$(R_f)_3CO[CF(CF_3)CF_2O]_nCF(CF_3)COF$$

(Temple, U.S.S.N. 504,168, filed Oct. 23, 1965).
Thus, the acid fluorides $$R_fO[CF(CF_3)CF_2O]_nCF(CF_3)COF$$

are readily available where $R_f$ is a perfluoroalkyl group, either straight or branched chain, or a cycloperfluoroalkyl group, of one to six carbons, and consequently $R_f$ in the monomers and polymers of this invention can have the same structures.

The acid fluorides are readily reduced to the corresponding alcohols $$R_fO[CF(CF_3)CF_2O]_nCF(CF_3)CH_2OH$$

for example with sodium brohydride or with hydrogen and catalysts as described in LeBleu & Fassnacht U.S. Patent 3,293,306.

The alcohols $$R_fO[CF(CF_3)CF_2O]_nCF(CF_3)CH_2OH$$

are readily converted to the corresponding acrylic or methacrylic acid esters of this invention by a number of means, for example, direct esterification of the acid with the alcohol in the presence of acids such as sulfuric acid; reaction of the alcohols with acrylic or methacrylic acid chlorides in the presence of tertiary amines, or by transesterification with lower alkyl esters, for example methyl or ethyl acrylate or methacrylate, in the presence of mineral acids such as sulfuric acid or tetraalkyl titanates such as tetraisopropyl titanate.

Although products could be manufactured containing an $R_f$ group of more than six carbons, this would require initial polymerization of the hexafluoropropylene oxide in the presence of perfluoroacid fluorides $R_fCOF$, perfluoroketones $(R_f)_2CO$ or perfluoro-tertiary-alcohol salts $(R_f)_3COCs$ containing more than six carbons. Such compounds are known but are relatively more expensive and a larger $R_f$ group in the esters $$R_fO[CF(CF_3)CF_2O]_nCF(CF_3)CH_2O_2CCR=CH_2$$

gives little useful benefit which counteracts the added cost. The preferred esters are those derived from the acid fluoride products obtained by polymerizing hexafluoropropylene oxide without added perfluoroacid fluoride, ketone or tertiary alcohol and thus have the structure $$CF_3CF_2CF_2O[CF(CF_3)CF_2O]_nCF(CF_3)CH_2O_2CCR=CH_2$$

The value of $n$ in the esters $$R_fO[CF(CF_3)CF_2O]_nCF(CF_3)CH_2O_2CCR=CH_2$$

may vary from zero to two. Esters can be prepared in which the value of $n$ exceeds two by the methods outlined earlier, but the polymers of such esters do not have the utility as oil and water repellents for textiles that the polymers of this invention have.

The methacrylic acid esters are the preferred esters of this invention, i.e., those preferred having the structure $$CF_3(CF_2)_2O[CF(CF_3)CF_2O]_yCF(CF_3)CH_2O_2\overset{CH_3}{\underset{|}{C}}C=CH_2$$

where $y$ is zero or one. Correspondingly, preferred polymers of this invention are those containing recurring units derived from said methacrylic acid esters.

The monomers $$R_fO[CF(CF_3)CF_2O]_nCF(CF_3)CH_2O_2CCR=CH_2$$

are readily polymerized or copolymerized by free radical initiated systems. Although bulk polymerization may be used, emulsion and solution polymerizations are preferred. The homopolymers of $$R_fO[CF(CF_3)CF_2O]_nCF(CF_3)CH_2O_2CCR=CH_2$$

are useful oil and water repellents when properly applied; however, it is preferred to use copolymers of $$R_fO[CF(CF_3)CF_2O]_nCF(CF_3)CH_2O_2CCR=CH_2$$

with vinylidene monomers as the basis for oil and water repellents. Such vinylidene monomers contain the polymerizable group $CH_2=C<$ and are free of non-vinylic fluorine, i.e., do not have flourine attached to the non-vinylic moiety of the vinylidene monomer. These vinylidene monomers include alkyl acrylates and methacrylates, acrylo and methacrylonitriles, vinyl esters of aliphatic acids, styrene and alkyl substituted styrenes, vinyl halides, vinylidene halides, allyl type esters, vinyl alkyl ketones, vinyl alkyl ethers and conjugated 1,3-dienes. Representative examples include: methyl acrylate and methacrylate, propyl acrylate and methacrylate, butyl acrylate and methacrylate, isoamyl acrylate and methacrylate, 2-ethylhexyl acrylate and methacrylate, octyl acrylate and methacrylate, octadecyl acrylate and methacrylate, lauryl acrylate and methcrylate, cetyl acrylate and methacrylate, stearyl acrylate and methacrylate, vinyl acetate, vinyl propionate, vinyl caprylate, vinyl laurate and vinyl stearate, styrene, α-methylstyrene, p-methylstyrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, vinyl methyl ether, vinyl butyl ether, vinyl ethyl ether, vinyl decyl ether, and vinyl stearyl ether.

The preferred vinylidene monomers are the alkyl methacrylates. It is also usually preferable, depending on the end use intended as discussed below, to include a small amount of one or more of N-methylolacrylamide or N-methylol methacrylamide; an aminoalkyl acrylate or aminoalkyl methacrylate ester; hydroxyethyl acrylate or hydroxyethyl methacrylate; or glycidyl acrylate or glycidyl methacrylate in the copolymer to increase durability to laundering or dry-cleaning. Usually from about 0.2% to 5% by weight of the total weight of the copolymer will be due to the monomers of the preceding sentence. The preferred alkyl methacrylates are n-butyl, n-amyl, n-hexyl, isoamyl, 2-ethylhexyl, n-heptyl, n-octyl, lauryl and stearyl methacrylates, depending on the end use intended. Styrene, 2,3-dichloro-1,3-butadiene and alkyl acrylates are also quite useful copolymer components but generally less preferable than the methacrylates. The copolymers should contain at least 25% by weight of the monomers $$R_fO[CF(CF_3)CF_2O]_nCF(CF_3)CH_2O_2CCR=CH_2$$

to be useful as oil and water repellents for textiles. Any amount greater than 25% up to 100% may be used.

When it is desired to apply the copolymers of this invention from aqueous media, it is most convenient to prepare the copolymers by the well known aqueous emulsion techniques. The process is carried out in a reaction vessel fitted with a stirrer and external means of either heating or cooling the charge. The monomer or monomers to be polymerized together is emulsified in a water solution of a surface active agent to a given emulsion concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound: These include:

2,2'-azodiisobutyramidine dihydrochloride,
2,2'-azodiisobutyronitrile,
2,2'-azobis(2,4-dimethyl-4-methoxyvaleronitrile),
sodium peroxide,
barium peroxide,
hydrogen peroxide,
ammonium persulfate,
potassium persulfate, and the like. The concentration of the catalyst for the polymerization usually is between 0.1% and 2% based on the weight of the monomers. The surface active agents employed to stabilize the emulsion during its makeup and polymerization are anionic, cationic, or non-ionic emulsifying agents, but preferably they are the cationic or anionic type. Representative anionic emulsifying agents are alkyl ($C_{10}$ to $C_{18}$)-sodium sulfate, sodium alkyl ($C_{12}$ to $C_{18}$)-benzenesulfonate, sodium alkylnaphthalenesulfonate, the sodium salt of sulfated alkenyl ($C_{16}$ to $C_{18}$)

acetate, sodium oleate, the sodium salt of sulfated methyl oleate, ammonium ω-H-polyfluoroalkanoate ($C_8$ to $C_{10}$), and ammonium perfluoroalkanoate. The cationic agents that may be employed include dodecyltrimethylammonium acetate, trimethyltetradecylammonium chloride, hexadecyltrimethylammonium bromide, trimethyloctadecylammonium chloride, (dodecylmethylbenzyl)-trimethylammonium chloride, benzyldodecyldimethylammonium chloride, N-[2-(diethylamino)ethyl] - oleamide hydrochloride, dimethyltetradecylammonium acetate, dimethylhexadecylammonium acetate and dimethyloctadecylammonium acetate. Non-ionic surface active agents that may be employed include condensation products of ethylene oxide with hexylphenol, isooctylphenol, hexadecanol, oleic acid, alkane ($C_{12}$–$C_{16}$)-thiol, alkyl ($C_{12}$–$C_{18}$) amines and the like. In addition, small amounts of chain transfer agents may be present during the polymerization, such as, for example, an alkanethiol of four to 12 carbon atoms.

A particularly preferred method for aqueous emulsion polymerization is that described in Netherlands published application 6,510,472, published Feb. 12, 1966, wherein the water insoluble monomers are prehomogenized in water prior to addition of any water soluble monomers and initiators. Water soluble initiators are used and chain transfer agents are usually included.

If an organic solvent can be tolerated in the aqueous system, the process of Sherman et al., U.S. Pat. 3,062,765, is also useful.

When it is desired to apply the copolymers of this invention from an organic solvent solution, it is preferred that the copolymers be prepared by solution polymerization techniques, which are well known in the art. The chosen monomers and the initiators are dissolved in the solvent in a reaction vessel fitted with a stirrer and means of either heating or cooling the charge. Concentrations of the monomer may vary from 5-50%. The reaction temperature is raised to between 40–100° C. to effect polymerization. When polymerization is complete, the resulting solution is usually used directly to prepare solutions. Useful initiators for solution polymerization are peroxide and azo compounds which are soluble in the organic solvent. These include an acyl peroxide such as benzoyl peroxide and lauroyl peroxide, organic peresters such as tertiary butyl perbenzoate, dialkyl peroxides such as ditertiarybutyl peroxide and organic azo compounds such as azobis(isobutyronitrile) and azobis (2,4-dimethylvaleronitrile) and known related compounds. The concentration of initiators will usually range from about 0.1% to about 2% based on the weight of monomers. If the solvent itself or other conditions are insufficient to properly control molecular weight, small amounts of chain transfer agents such as alkanethiols with four to 12 carbons may be added. The preferred solvents for solution polymerization are tetrachloroethylene, trichlorotrifluoroethane and tetrachlorodifluoroethane.

Although the homo or copolymers of the monomers $R_fO[CF(CF_3)CF_2O]_nCF(CF_3)CH_2O_2CCR{=}CH_2$ are useful alone as oil and water repellents when suitably applied, it has been found that more efficient use of these copolymers results if they are mixed with vinylidene polymers. These vinylidene polymers are free of non-vinylic fluorine. Such mixtures of polymers must contain at least 3% by weight of units derived from the monomer $R_fO[CF(CF_3)CF_2O]_nCF(CF_3)CH_2O_2CCR{=}CH_2$ Any amount greater than 3% may be used, including, of course, the instance where the homopolymers of $R_fO[CF(CF_3)CF_2O]_nCF(CF_3)CH_2O_2CCR{=}CH_2$ are used alone, but use of less than 3% results in unsatisfactory oil and water repellencies. The preferred amount varies with the particular end use.

The vinylidene polymers are prepared by any useful means. The emulsion and solution methods described hereinbefore are useful in most cases for preparation of the vinylidene polymers. The same vinylidene monomers which were described earlier as useful for preparing copolymers of $R_fO[CF(CF_3)CF_2O]_nCF(CF_3)CH_2O_2CCR{=}CH_2$ are, in addition, certain useful vinyldidene polymers, particularly in certain solvent application systems as The vinylidene polymers may be homopolymers or copolymers of two or several vinylidene monomers. There are, in addition, certain useful vinylidene polymers, particularly in certain solvent application systems as described below, which are prepared from monomers other than those described earlier.

As was indicated earlier, the compositions of this invention may be applied from aqueous emulsion systems or from organic solvent systems. As these compositions vary somewhat, particularly in the preferred polymers of $R_fO[CF(CF_3)CF_2O]_nCF(CF_3)CH_2O_2CCR{=}CH_2$ the preferred vinylidene polymers, the methods of application, additional useful adjuvants and useful substrates, they are discussed separately hereinbelow.

Application from aqueous emulsion systems has the greatest versatility and broadest usefulness of the several available systems. In such systems, an emulsion of the polymer of $R_fO[CF(CF_3)CF_2O]_nCF(CF_3)CH_2O_2CCR{=}CH_2$ the vinylidene polymer and any desired adjuvants are prepared most readily by mixing emulsions of the two types of polymers and adding the adjuvants as desired.

In aqueous emulsion systems, it is preferred to use copolymers of $R_fO[CF(CF_3)CF_2O]_nCF(CF_3)CH_2O_2CCR{=}CH_2$ and the vinylidene monomer containing larger amounts of the fluorinated ester monomers, 40% or greater. To increase durability of the resulting oil- and water-repellent copolymers, from 0.2% to 5% of N-methylolacrylamide or methacrylamide, an aminoalkyl acrylate or methacrylate ester, or 2-hydroxyethyl acrylate or methacrylate, or mixtures of these are added. Most preferably, from 1% to 5% of units derived from the vinylidene monomer, preferably alkyl esters of acrylic or methacrylic acid are present. Some preferred examples are the copolymers containing 97.7%

$C_3F_7O[CF(CF_3)CF_2O]_nCF(CF_3)CH_2O_2CC(CH_3){=}CH_2$ where $n$ is 0 or 1, 1.8% butyl acrylate and 0.5% N-methylolacrylamide; and 74.6%

$C_3F_7O[CF(CF_3)CF_2O]_nCF(CF_3)CH_2O_2CC(CH_3){=}CH_2$ where $n$ is 0 or 1, 24.9% 2-ethylhexyl methacrylate, 0.25% 2-hydroxyethyl methacrylate and 0.25% N-methylolacrylamide. These are illustrative of course and can be varied widely.

Emulsions of any of the vinylidene polymers previously indicated may be mixed with the above copolymers for application. The particularly preferred vinylidene polymers for use in aqueous emulsion systems are those of alkyl acrylates or methacrylates, particularly the latter. As with the copolymers above, it is preferred to have a small amount, e.g., 0.1% to 5%, of N-methylolacrylamide or methacrylamide, an aminoalkyl acrylate or methacrylate ester or 2-hydroxyethyl acrylate or methacrylate, or mixtures thereof, in these vinylidene polymers. A preferred vinylidene polymer is the polymer of 2-ethylhexyl methacrylate containing 0.1% N-methylolacrylamide. This is again illustrative and can be varied widely.

Occasionally, it is desirable that the vinylidene polymer be crosslinked. This is readily accomplished by including therein from 0.05% to 10% by weight of non-conjugated divinyl compound. Such crosslinked vinylidene polymers are particularly useful when the compositions of this invention are being co-applied with certain melamineformaldehyde condensates such as those described in U.S. Pat. 2,783,231, and the running temperatures exceed 120° F. Under such conditions, a gummy mass may form on pad-rolls and the like unless the vinylidene polymer is crosslinked.

The nonconjugated divinyl compounds must contain two polymerizable vinyl groups. Each vinyl group must polymerize independently of the other; that is, the two vinyl groups cannot polymerize together as a unit such as occurs in conjugated divinyl compounds such as 1,3-butadiene or substituted 1,3-butadienes. These divinyl compounds may be acrylic type esters of alkanediols, divinyl esters of alkanedioic acids, vinyl esters of acrylic type acids, allylic esters of acrylic type acids, divinyl substituted aromatic compounds in similar related compounds. Representative examples include ethylene glycol diacrylate and dimethacrylate, 1,3-propylene glycol diacrylate and dimethacrylate, tetramethylene glycol diacrylate and dimethacrylate, pentamethylene glycol diacrylate and dimethacrylate, hexamethylene glycol diacrylate and dimethylacrylate, decamethylene glycol diacrylate and dimethylacrylate, diethylene glycol diacrylate and dimethacrylate, divinyl succinate, divinyl adipate, divinyl suberate, divinyl benzene, divinyl toluene, vinyl acrylate and methacrylate, vinyl α-chloroacrylate and allyl acrylate and methacrylate.

The aqueous emulsion may contain only the copolymer of

and the vinylidene polymer. Under such circumstances, the mixtures will preferably contain at least about 25% of polymerized fluorinated monomer. It is common practice in the textile industry to treat fabrics with several agents at the same time. These agents may include softeners, crease-resistance agents, wetting agents, antistatic agents, resin finishes and the like. Many of these agents tend to dilute the vinylidene polymer portion of the present polymer composition with materials which are inert as oil and water repellents. In such cases better results are obtained if higher concentrations of copolymers of

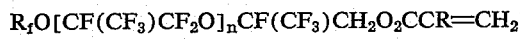

are used than when mixtures of these copolymers and the vinylidene polymers are used alone. As indicated earlier, when other adjuvants are not used about 25% by weight polymerized fluorinated monomer in the polymer composition is preferred. When other adjuvants are present, larger amounts of the copolymer give better results and indeed, the vinylidene polymer may be omitted if sufficient other additives are present. About 40% by weight polymerized monomer is preferred in such cases, particularly from a value in use viewpoint.

Suitable substrates for the application of the compositions of this invention are films, fibers, yarns, fabrics, and articles made from filaments, fibers, or yarns derived from natural, modified natural, or synthetic polymeric materials or from blends of these other fibrous materials and other porous materials which will absorb and transport low surface tension liquids either on their surfaces or in their interstices by capillary action. Specific representative examples are cotton, silk, wool, regenerated cellulose, nylon, fiber-forming linear polyesters, fiber-forming polyacrylonitrile, cellulose nitrate, cellulose acetate, ethyl cellulose, paper, fiber glass, wood pressed or otherwise hardened wood composites, metals unglazed porcelain, porous concrete and the like. Dyed and undyed cotton sateen, poplin, broadcloth, jean cloth, gabardine and the like are especially adaptable for treatment with the compositions of this invention to provide products having a high repellency to oil and water and being relatively unaffected by the action of heat, air and light. Materials rendered oil and water repellent by the invention polymer compositions retain a portion of the original repellent when laundered and dry cleaned.

The compositions are applied from aqueous dispersion by brushing, dipping, spraying, padding, roll-coating or by any combination of these methods. For example, the pprepared concentrated dispersion of polymer composition may be used as a pad bath by diluting it with water to a solids content of 0.1% to 10% by weight of the bath. The textile material, or paper if desired, is padded in this bath, and is then freed of excess liquid, usually by squeeze rolls, so that the dry pickup (weight of the dry polymer on fiber) is between about 0.1 and 10% by weight of the fiber. The fabric so treated must contain at least 0.3% by weight of

in polymerized form. The treated material is then heated at 165° C. to 195° C. for at least about 15 seconds to impart maximum durability of the agent on the material. The resulting textile material or paper will be found to be resistant to water and oil, and the textile material will retain its resistance to such agents even after many launderings and dry cleanings.

When the copolymers are to be applied from solution, it is preferable to include 0.2 to 5% of glycidyl acrylate or methacrylate in the copolymer, rather than the methylol-amides, aminoalkyl acrylics or hydroxyalkyl acrylics described hereinbefore for use with polymers applied from aqueous emulsion. In addition, certain vinylidene polymers not described earlier are useful in solvent systems. These include chlorosulfonated hydrocarbon polymers such as chlorosulfonated polyethylene (U.S. Pat. 2,586,363), certain polyurethanes as described in U.S. Pat. 2,929,800 and certain vinylidene polymers containing acid halide groups such as the terpolymer of ethylene, vinyl acetate and methacrylyl chloride, for example, in the ratio 74/22/4. Solutions, generally in the solvents previously described for solution polymerization, are applied to textiles, usually containing 0.1–10% by weight total solids, by spraying or dipping. The solvent is then evaporated and the textile is cured at 165–195° C. for at least 15 seconds. Solution applications are useful for fabrics which cannot tolerate water.

EXAMPLES

Starting materials were prepared by art methods, that is $n$-C$_3$F$_7$OCF(CF$_3$)CH$_2$OH and $n$-C$_3$F$_7$OCF(CF$_3$)CF$_2$OCF(CF$_3$)CH$_2$OH were prepared from hexafluoropropylene oxide using the procedure by Moore et al., U.S. 3,250,808, Example 4, to obtain the acid fluoride, and the acid fluorides were reduced to the above alcohols using sodium borohydride, as taught by LeBleu and Fassnacht, U.S. 3,293,306.

Using the same procedures, $n$-C$_3$F$_7$O[CF(CF$_3$)CF$_2$O]$_3$CF(CF$_3$)CH$_2$OH was prepared for comparison purposes.

EXAMPLE 1

(A) Preparation of

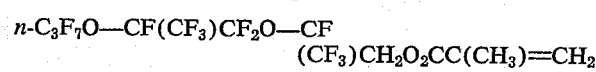

To a solution of 172.7 parts

in 300 parts anhydrous ethylene glycol dimethyl ether was added under anhydrous conditions a solution of 35 parts methacrylyl chloride and 33.8 parts triethylamine in an equal volume of ethylene glycol dimethyl ether over a period of about two hours. While maintaining the reaction mass at 0° C. After stirring for six hours at 0° C. and eight hours at ambient temperature, the reaction mass was separated from precipitated triethylamine hydrochloride by filtration and the solvent was evaporated from the filtrate at reduced pressure. The residue was distilled at reduced pressure, using tetramethyldiphenylene quinone inhibitor, giving $n\text{-}C_3F_7OCF(CF_3)CF_2OCF(CF_3)CH_2O_2CC(CH_3)=CH_2$ 165.1 parts, 95.2% yield, B.P. 31–33° C. at 0.5 mm. pressure.

*Analysis.*—Calc'd for $C_{13}H_{17}O_4F_7$ (percent): C, 28.4; H, 1.3; F, 58.6. Found (percent): C, 26.6; H, 1.1; F, 58.6.

(B) Preparation of $n\text{-}C_3F_7O\text{---}CF(CF_3)CF_2\text{---}CF(CF_3)CH_2O_2CCH=CH_2$ If the procedure of Part A is repeated, replacing the 35 parts methacrylyl chloride with 30.3 parts acrylyl-chloride, the corresponding acrylate ester $n\text{-}C_3F_7OCF(CF_3)CF_2OCF(CF_3)CH_2O_2CCH=CH_2$ is obtained.

(C) Preparation of $n\text{-}C_3F_7O\text{---}CF(CF_3)CH_2O_2CC(CH_3)=CH_2$

When the procedure of Part A is repeated, replacing the 172.7 parts $n\text{-}C_3F_7OCF(CF_3)CF_2OCF(CF_3)CH_2OH$ with 120.6 parts $n\text{-}C_3F_7OCF(CF_3)CH_2OH$, the methacrylate ester $n\text{-}C_3F_7OCF(CF_3)CH_2O_2CC(CH_3)=CH_2$ B.P. 56–58° C. at 19.0 mm. is obtained in 85.3% yield.

*Analysis.*—Calc'd for $C_{10}H_7F_{11}O_3$ (percent): C, 31.3; H, 1.8; F, 54.4. Found (percent): C, 32.3; H, 1.5; F, 54.3.

(D) Preparation of $n\text{-}C_3F_7O\text{---}CF(CF_3)CH_2O_2CCH=CH_2$

If the procedure of Part A is repeated using 30.3 parts acrylyl chloride and 120.6 parts $n\text{-}C_3F_7OCF(CF_3)CH_2OH$ the acrylic ester $n\text{-}C_3F_7OCF(CF_3)CH_2O_2CCH=CH_2$ is obtained.

(E) Preparation of
$n\text{-}C_3F_7O\text{---}[CF(CF_3)CF_2O]_3CF$
$(CF_3)CH_2O_2CC(CH_3)=CH_2$ When a solution of 20.9 parts methacrylyl chloride and 20.3 parts triethylamine in an equal volume anhydrous ethylene glycol dimethyl ether is added to a solution of 155.7 parts $n\text{-}C_3F_7O[CF(CF_3)CF_2O]_3CF(CF_3)CH_2OH$ in 175 parts ethylene glycol dimethyl ether, using the procedure of Part A, 110.1 parts (64.4%) of $n\text{-}C_3F_7O[CF(CF_3)CF_2O]_3CF$
$(CF_3)CH_2O_2CC(CH_3)=CH_2$ B.P. 86–90° C. at 0.8 mm. pressure, is obtained.

*Analysis.*—Calc'd for $C_{19}H_7F_{29}O_6$ (percent): C, 25.8; H, 0.79; F, 62.3. Found (percent): C, 25.9; H, 0.8; F, 63.0.

(F) Preparation of
$n\text{-}C_3F_7O\text{---}[CF(CF_3)CF_2O]_3CF(CF_3)CH_2O_2CCH=CH_2$ When a solution of 18.1 parts acrylyl chloride and 20.3 parts triethylamine in an equal volume of ethylene glycol dimethyl ether was added to a solution of 138.3 parts $n\text{-}C_3F_7O[CF(CF_3)CF_2O]_3CF(CF_3)CH_2OH$ in 175 parts ethylene glycol dimethyl ether, 77.0 parts (52.4%) of $n\text{-}C_3F_7O[CF(CF_3)CF_2O]_3CF(CF_3)CH_2O_2CCH=CH_2$ B.P. 72–75° C. at 0.4 mm., was obtained.

*Analysis.*—Calc'd for $C_{18}H_5F_{29}O_6$ (percent): C, 24.9; H, 0.58; F, 63.4. Found (percent): C, 24.9; H, 0.6; F, 63.4.

EXAMPLE 2

Polymerization general procedure

The following recipe was used:

| | |
|---|---|
| Water | 40 ml. |
| Water | 15.6 ml. |
| Dimethyloctadecylamine acetate (50% in water) | 4.6 ml. |
| Acetic acid | 0.76 ml. |
| Monomer of this invention | 20.0 grams |
| 10% dodecylmercaptan in n-butyl acrylate | 0.08 ml. |
| n-Butyl acrylate | 0.37 ml. |
| N-methylolacrylamide (60% aqueous) | 0.15 ml. |
| Azobisisobutyramidine dihydrochloride | 0.008 g. |

The mixture of water, amine acetate and acetic acid was added to the water and stirred until dissolved. The monomer was then added and stirred until dispersed. The mercaptan, butyl acrylate and acrylamide were added and the final mixture heated under nitrogen to about 70° C. The azo compound was then added and polymerization was continued for about four hours at 70° C. The results are shown below in Table I.

TABLE I

| Monomer | Percent solids | Inherent viscosity * |
|---|---|---|
| (I) n-C₃F₇OCF(CF₃)CF₂OCF(CF₃)CH₂O₂CC(CH₃)=CH₂ | 22.5 | 0.734 at 0.1%. |
| (II) n-C₃F₇OCF(CF₃)CH₂O₂CC(CH₃)=CH₂ | | |
| (III) n-C₃F₇O[CF(CF₃)CF₂O]₃CF(CF₃)CH₂O₂CCH=CH₂ | 21.1 | 0.50 at 0.5%. |
| (IV) n-C₃F₇O[CF(CF₃)CF₂O]₃CF(CF₃)CH₂O₂CC(CH₃)=CH₂ | 24.0 | 0.44 at 0.5%. |
| (V) n-C₃F₇O[CF(CF₃)CF₂O]₂CF(CF₃)CH₂O₂CC(CH₃)=CH₂ | 22.8 | 0.40 at 0.5%. |

* Inherent viscosity = $\frac{1}{C} \ln[\eta]/[\eta_0]$ where C is polymer concentration in g./100 ml. solution, ln is the natural logarithm, $[\eta]$ is the viscosity of the solution and $\eta_0$ the viscosity of the solvent, C and n being at the indicated concentration in 1,1,2-trichloro-1,2,2-trifluoroethane at 30° C.

The above polymers contain about 1.8% butyl acrylate and 0.5% N-methylolacrylamide, the remainder (97.7%) being $n\text{-}C_3F_7O[CF(CF_3)CF_2O]_nCF(CF_3)CH_2O_2CCR=CH_2$

EXAMPLE 3

The polymerization procedure of Example 2 was used with the recipe below.

| | |
|---|---|
| Water | 400 ml. |
| 50% aqueous dimethyloctadecylamine acetate | 2.9 ml. |
| Water | 17.5 ml. |
| Acetic acid | 0.53 ml. |
| n-C₃F₇O[CF(CF₃)CF₂O]ₙCF(CF₃)CH₂O₂CCR=CH₂ | 15.0 g. |
| 2-ethylhexyl methacrylate | 5.0 g. |
| 2-hydroxyethyl methacrylate | 0.05 g. |
| Dodecyl mercaptan | 0.01 g. |
| 60% aqueous N-methylolacrylamide | 0.072 ml. |
| Azobisisobutyramidine dihydrochloride | 0.008 g. |

The 2-ethylhexyl methacrylate and fluorinated ester were added together and emulsified as described for the fluorinated ester in Example 2. After polymerization at 70° C. for four hours, the results shown below in Table II were obtained.

TABLE II

| Monomer | Percent solids | Inherent viscosity * |
|---|---|---|
| (I) n-$C_3F_7OCF(CF_3)CF_2OCF(CF_3)CH_2O_2CC(CH_3)=CH_2$ | 23.2 | 1.3 at 5%. |
| (II) n-$C_3F_7O[CF(CF_3)CF_2O]_3CF(CF_3)CH_2O_2CCH=CH_2$ | 19.0 | 0.76 at 0.5%. |
| (III) n-$C_3F_7O[CF(CF_3)CF_2O]_3CF(CF_3)CH_2O_2CC(CH_3)=CH_2$ | 24.0 | 0.78–0.84 at 0.5%. |

* See Example 2.

The above polymers contained 0.5% 2-hydroxyethyl methacrylate, 0.4% N-methylolacrylamide, 24.9% 2-ethylhexyl methacrylate and 74.2%

$$n-C_3F_7O[CF(CF_3)CF_2O]_nCF(CF_3)CH_2O_2CCR=CH_2$$

EXAMPLE 4

A mixture of 2140 ml. water, 106 ml. dimethyloctadecylamine and 64 ml. acetic acid was stirred until solution was complete. It was then added to 2310 ml. water, followed by 1000 g. of $$n-C_3F_7O[CF(CF_3)CF_2O]_nCF(CF_3)CH_2O_2CCR=CH_2$$

monomer and 540 g. commercial lauryl methacrylate (60% n-$C_{12}$, 27% n-$C_{14}$, 7% lower esters, 6% higher esters, mole weight 262). The resulting mixture was stirred until emulsified, then 3.7 ml. 2-hydroxyethyl methacrylate, 5.86 ml. 60% aqueous N-methylol acrylamide and 0.28 ml. dodecyl mercaptan were added. The mixture was heated to 70° C. with stirring, where 0.65 g. azobisisobutyramidine hydrochloride was added. Heating was continued for four hours with agitation. The results are shown below in Table III.

TABLE III

| Monomer | Percent solids | Inherent viscosity |
|---|---|---|
| (I) n-$C_3F_7OCF(CF_3)CF_2OCF(CF_3)CH_2O_2CC(CH_3)=CH_2$ | 23.5 | 1.9 at 0.5%. |
| (II) n-$C_3F_7OCF(CF_3)CH_2O_2CC(CH_3)=CH_2$ | | |
| (III) n-$C_3F_7O[CF(CF_3)CF_2O]_3CF(CF_3)CH_2O_2CCH=CH_2$ | 18.0 | 1.02–1.06 at 0.5%. |
| (IV) n-$C_3F_7O[CF(CF_3)CF_2O]_3CF(CF_3)CH_2O_2CC(CH_3)=CH_2$ | 22.8 | 1.1 at 0.5%. |

* See Example 2.

EXAMPLE 5

(A) An aqueous emulsion was run at 70° C. for four hours, using the following recipe added in the order shown; the general procedure was analogous to that of Examples 3 and 4.

| | Parts |
|---|---|
| Demineralized water | 2200 |
| Octadecylidmethylamine | 20 |
| Acetic acid | 12.2 |
| 2-ethylhexyl methacrylate | 1000 |
| Acetone | 237 |
| Sodium chloride | 0.7 |
| N-methylolacrylamide (as 60% solution) | 18 |
| Azobis(isobutyramidine)dihydrochloride | 0.222 |

Approximately a 30% polymer containing 98% 2-ethylhexyl methacrylate and 2% N-methylolacrylamide was obtained.

(B) The polmerization of Part A was repeated at 70° C. for four hours with the following recipe added in the order shown.

| | Parts |
|---|---|
| Water | 2200 |
| Dimethyloctadecylamine | 20 |
| Acetic acid | 12.2 |
| 2-ethylhexyl methacrylate | 950.0 |
| N-methylolacrylamide (as 60% solution) | 18 |
| Ethylene dimethacrylate | 5.0 |
| Acetone | 237 |
| Sodium chloride | 0.7 |
| Azobis(isobutyramidine)dihydrochloride | 0.222 |

Approximately a 30% polymer containing 97.7% 2-ethylhexyl methacrylate, 1.8% N-methylolacrylamide and 0.5% ethylene dimethacrylate was obtained.

EXAMPLE 6

The various aqueous emulsions of the polymers of Examples 2, 3 and 4 were combined with the emulsions of Example 5, Parts A and B to form emulsions wherein the total solids contained 40% by weight of $$n-C_3F_7O[CF(CF_3)CF_2O]_nCF(CF_3)CH_2O_2CCR=CH_2$$

in polymerized form. The resulting emulsions were then diluted to 13.5% solids content. The following combinations were prepared:

| Combination No. | Copolymer of this invention employed | | Polymer of Example 5 employed |
|---|---|---|---|
| | Polymer of example— | No. | |
| 1 | 2 employing ester monomer | I | A |
| 2 | do | II | A |
| 3 | do | III | A |
| 4 | do | IV | A |
| 5 | do | I | B |
| 6 | do | III | B |
| 7 | do | IV | B |
| 8 | 3 employing ester monomer | I | A |
| 9 | do | II | A |
| 10 | do | III | A |
| 11 | do | I | B |
| 12 | do | II | B |
| 13 | do | III | B |
| 14 | 4 employing ester monomer | I | A |
| 15 | do | II | A |
| 16 | do | III | A |
| 17 | do | IV | A |

EXAMPLE 7

Pad baths were prepared containing the following ingredients, based on weight of fabric (OWF) to which they were to be applied:

| Component: | Percent OWF |
|---|---|
| Melamine Derivative [a] | 2.0. |
| Dispersant [b] | As indicated. |
| Wash/wear resin [c] | 5. |
| $MgCl_2$ | 0.5. |
| Example 6 emulsion | As indicated. |

[a] Melamine derivative: 27% A.I. dispersion in water of solids, solids being 46% paraffin wax, 46% reaction product of hexamethoxy methyl melamine with three moles commercial behenic acid, 4% dimethyloctadecylamine acetate and 4% dimethyltetradecylamine acetate.

[b] 30% Aqueous solution of the hydrochloride salt of

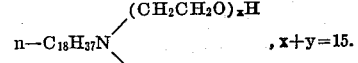

, x+y=15.

[c] A condensate of a triazine with formaldehyde (Aerotex M23 Special, American Cyanamid Co.).

The dispersant concentrations and type of concentration of Example 7 emulsions were as follows:

| Bath No. | Dispersant, percent OWF | Emulsion Example 6 emulsion No. | Concentration, percent OWF |
|---|---|---|---|
| 1* | 0.035 | 1 | 1.5 |
| 2* | 0.045 | 1 | 2.5 |
| 3* | 0.035 | 2 | 1.5 |
| 4* | 0.045 | 2 | 2.5 |
| 5 | 0.035 | 3 | 1.5 |
| 6 | 0.045 | 3 | 2.5 |
| 7 | 0.035 | 4 | 1.5 |
| 8 | 0.045 | 4 | 2.5 |
| 9* | 0.035 | 5 | 1.5 |
| 10* | 0.045 | 5 | 2.5 |
| 11 | 0.035 | 6 | 1.5 |
| 12 | 0.045 | 6 | 2.5 |
| 13 | 0.035 | 7 | 1.5 |
| 14 | 0.045 | 7 | 2.5 |
| 15* | 0.035 | 8 | 1.5 |
| 16* | 0.045 | 8 | 2.5 |
| 17 | 0.035 | 9 | 1.5 |
| 18 | 0.045 | 9 | 2.5 |
| 19 | 0.035 | 10 | 1.5 |
| 20 | 0.045 | 10 | 2.5 |
| 21* | 0.035 | 11 | 1.5 |
| 22* | 0.045 | 11 | 2.5 |
| 23 | 0.035 | 12 | 1.5 |
| 24 | 0.045 | 12 | 2.5 |
| 25 | 0.035 | 13 | 1.5 |
| 26 | 0.045 | 13 | 2.5 |

*Represents a pad bath containing a polymeric composition of this invention.

Each of these 26 baths was padded onto Fabric 112 (65/35 "Dacron" polyester/cotton poplin, tan-Thermosol dyes, Fairforest Mills) and 407 cotton poplin (undyed merceurized, neutral pH, no whiteners, 1.6 yards/pound 46 inches wide) at about 50% wet pickup, dried at 340° F. then cured for two minutes at 340° F.

The oil and water repellencies were evaluated using the methods described below.

The fabric samples were tested for water repellency using A.A.T.C.C. Standard Test Method 22–1952 of the American Association of Textile Chemists and Colourists. A rating of 100 denotes no water penetration or surface adhesion; a rating of 90 denotes slight random sticking or wetting, and so on.

The oil-repellency test comprises placing a drop of test solution carefully on the textile on a flat horizontal surface. After three minutes, any penetration or wicking into the fabric is noted visually. To aid in the observation, the test solutions contained a small amount of oil-soluble blue dye to increase visibility. The nature of the test solutions is shown below; Nujol, of course, is a purified petroleum oil. Anything with a rating of 5 or greater is good or excellent; anything with a rating of 2 or over can be used only for certain purposes. As an example, if a treated fabric repels the No. 2–6 solutions, but not the No. 7 solution, its rating is 6. If Nujol penetrates, the rating is zero.

| Oil-repellency rating | Test solution | Surface tension, dynes/cm. at 25° C. |
|---|---|---|
| 9 | n-Heptane | 20.0 |
| 8 | n-Octane | 21.8 |
| 7 | n-Decane | 23.5 |
| 6 | n-Dodecane | 25.0 |
| 5 | n-Tetradecane | 26.7 |
| 4 | 50-50 hexadecane-Nujol | 28.7 |
| 3 | 25-75 hexadecane-Nujol | 30.3 |
| 2 | Nujol | 31.2 |

After the oil and water repellency ratings were determined, a portion of each treated fabric sample was given three standard washings and oil and water repellency ratings were again determined. A standard washing consists of agitating the treated fabric for 40 minutes at 60° C. to 100° C. in water containing 0.1% by weight of a neutral chip soap+0.05% soda ash, rinsing with 60° C. water three times, spin drying, then pressing on each face at 300° F.±20° F. for 30 seconds. A portion of each treated fabric sample was also given three standard dry cleanings and the oil and water repellency ratings were again determined. A standard dry cleaning consists of agitating the treated fabric for 20 minutes in tetrachloroethylene containing 2% commercial dry cleaning detergent (R. R. Street Company) and 0.5% water. The fabrics were then dried by first centrifuging for one minute followed by drying for five minutes in a tumble dryer at 160° F. The fabrics were then pressed 15 seconds on each face at 300° F.±20° F.

The oil repellency test described above is identical to test method No. 118–1966T of the American Association of Textile Chemists and Colorists with two exceptions: (a) the same test solutions are given numbers one greater here than in the test method, and (b) the determinations are made after 3 minutes rather than the 30 seconds required by the test method. The oil rating test used herein is thus somewhat more severe than the official test method.

The results are shown below.

REPELLENCIES

| | Fabric 112 | | | | | | 407 poplin | | | | | |
|---|---|---|---|---|---|---|---|---|---|---|---|---|
| | Initial | | 3SW(a) | | 1DC(a) | | Initial | | 3SW(a) | | 1DC(a) | |
| Bath No. | Oil | Water | Oil | Water | Oil | Water | Oil | Water | Oil | Water | Oil | Water |
| 1* | 2 | 80- | 2 | 80- | 3 | 70 | 3 | 80- | 3 | 80- | 3 | 70 |
| 2* | 3 | 80 | 3 | 80 | 4 | 70 | 3 | 80 | 4 | 80 | 4 | 70 |
| 3* | 3 | 80- | 4 | 80- | 4 | 80 | | | | | | |
| 4* | 3 | 80- | 3 | 70 | 5 | 80- | | | | | | |
| 5 | 0 | 80 | 0 | 70 | 0 | 50 | 0 | 80 | 0 | 80 | 0 | 50 |
| 6 | 0 | 80 | 0 | 70 | 0 | 50 | 0 | 80 | 0 | 70 | 0 | 50 |
| 7 | 0 | 80 | 0 | 80- | 2 | 70 | 0 | 80 | 0 | 70 | 0 | 70 |
| 8 | 0 | 90 | 0 | 80- | 2 | 70 | 0 | 80 | 0 | 70 | 2 | 70 |
| 9* | 2 | 80- | 2 | 80- | 2 | 70 | 4 | 80- | 3 | 70 | 4 | 70 |
| 10* | 4 | 80- | 4 | 80- | 4 | 70 | 4 | 80 | 4 | 70 | 4 | 70 |
| 11 | 0 | 80- | 0 | 70 | 0 | 0 | 0 | 80 | 0 | 80- | 0 | 0 |
| 12 | 0 | 80- | 0 | 70 | 0 | 0 | 0 | 80 | 0 | 50 | 0 | 0 |
| 13 | 0 | 80 | 0 | 70 | 0 | 0 | 0 | 80- | 0 | 70 | 0 | 50 |
| 14 | 0 | 80 | 0 | 70 | 0 | 0 | 0 | 80- | 0 | 70 | 0 | 50 |
| 15* | 4 | 80 | 4 | 80 | 4 | 70 | 4 | 90 | 4 | 90 | 4 | 50 |
| 16* | 4 | 80 | 4 | 80 | 4 | 70 | 5 | 100 | 5 | 70 | 5 | 50 |
| 17 | 0 | 80 | 0 | 80- | 0 | 50 | 0 | 80 | 0 | 70 | 0 | 70 |
| 18 | 0 | 80 | 0 | 70 | 0 | 70 | 0 | 80 | 0 | 70 | 0 | 70 |
| 19 | 2 | 80- | 2 | 80 | 0 | 70 | 0 | 80 | 0 | 70 | 0 | 70 |
| 20 | 2 | 80- | 3 | 80 | 2 | 70 | 2 | 80- | 2 | 70 | 3 | 70 |
| 21* | 4 | 80 | 4 | 80 | 3 | 70 | 5 | 80 | 4 | 70 | 4 | 70 |
| 22* | 5 | 100 | 4 | 80 | 4 | 70 | 6 | 100 | 5 | 80 | 5 | 70 |
| 23 | 0 | 80- | 0 | 70 | 0 | 0 | 0 | 80 | 0 | 50 | 0 | 0 |
| 24 | 0 | 80- | 0 | 70 | 0 | 0 | 0 | 80 | 0 | 70 | 0 | 50 |
| 25 | 0 | 80- | 0 | 70- | 0 | 50 | 2 | 80- | 0 | 70 | 0 | 50 |
| 26 | 3 | 80- | 2 | 70 | 0 | 50 | 0 | 80- | 0 | 70 | 0 | 0 |

*Represents results obtained from a pad bath mixture containing a polymeric composition of this invention.

EXAMPLE 8

Pad baths were prepared containing the following ingredients, based on weight of fabric (OWF) to which they were to be applied.

Component:
- Water Repellent [a] _____ As indicated.
- Dispersion [b] _____ As indicated.
- Wash/wear Resin [c] _____ 5.0.
- $MgCl_2$ _____ 0.5.
- Example 6 emulsion _____ As indicated.

[a] Water repellent: A mixture of 67 parts melamine-formaldehyde condensation product and 25 parts catalyst. The melamine-formaldehyde product istelf consists of 25% petroleum wax and 75% reaction product of hexamethoxy methyl melamine+3 moles stearic acid+1 mole triethanolamine, neutralized with acetic acid, U.S. Pat. 2,783,231. The catalyst consists of 2 parts aluminum glycolate and one part glycolic acid.
[b,c] Same as Example 7.

The dispersant concentrations and type and concentration of Example 8 emulsions were as follows:

| Bath No. | Water repellent, percent OWF | Dispersant, percent OWF | Example 6 emulsion No. | Concentration, percent OWF |
|---|---|---|---|---|
| 1* | 0.8 | 0.035 | 1 | 1.5 |
| 2* | 0.8 | 0.045 | 1 | 2.5 |
| 3* | 2.0 | 0.035 | 2 | 1.5 |
| 4* | 2.0 | 0.045 | 2 | 2.5 |
| 5 | 0.8 | 0.035 | 3 | 1.5 |
| 6 | 0.8 | 0.045 | 3 | 2.5 |
| 7 | 2.0 | 0.035 | 4 | 1.5 |
| 8 | 2.0 | 0.045 | 4 | 2.5 |
| 9* | 0.8 | 0.035 | 5 | 1.5 |
| 10* | 0.8 | 0.045 | 5 | 2.5 |
| 11 | 0.8 | 0.035 | 6 | 1.5 |
| 12 | 0.8 | 0.045 | 6 | 2.5 |
| 13 | 0.8 | 0.035 | 7 | 1.5 |
| 14 | 0.8 | 0.045 | 7 | 2.5 |
| 15* | 0.8 | 0.035 | 8 | 1.5 |
| 16* | 0.8 | 0.045 | 8 | 2.5 |
| 17 | 0.8 | 0.035 | 9 | 1.5 |
| 18 | 0.8 | 0.045 | 9 | 2.5 |
| 19 | 2.0 | 0.035 | 10 | 1.5 |
| 20 | 2.0 | 0.045 | 10 | 2.5 |
| 21* | 0.8 | 0.035 | 11 | 1.5 |
| 22* | 0.8 | 0.045 | 11 | 2.5 |
| 23 | 0.8 | 0.035 | 12 | 1.5 |
| 24 | 0.8 | 0.045 | 12 | 2.5 |
| 25 | 0.8 | 0.035 | 13 | 1.5 |
| 26 | 0.8 | 0.045 | 13 | 2.5 |

*Represents a pad bath containing a polymeric composition of this invention.

Each of these 26 baths was padded on Fabric 112 and 407 cotton poplin (both described in Example 7) at about 50% wet pickup, dried at 340° F. and cured for two minutes at 340° F. Repellencies were determined initially, after three washings and one dry cleaning with the results shown below.

In Examples 7 and 8, Baths 1, 2, 3, 4, 9, 10, 15, 16, 21 and 22 represent this invention while Baths Nos. 5, 6, 7, 8, 11, 12, 13, 14, 17, 18, 19, 20, 23, 24, 25 and 26 represent compositions outside this invention.

EXAMPLE 9

Pad baths were made up having the composition shown below, based on weight of fabric (OWF) to which they were to be applied.

| Component: | Percent OWF |
|---|---|
| Melamine Derivative [a] | 2.0. |
| Dispersant [b] | As indicated. |
| Surfactant [c] | 0.03. |
| Isopropyl alcohol | 2.0. |
| Permanent press resin [d] | 12.0. |
| Softener [e] | 0.25. |
| Example 6 emulsion | As indicated. |
| 27% zinc nitrate solution | 2.5. |

[a] Melamine derivative, Example 7.
[b] Dispersant, Example 7.
[c] Surfactant—$C_{13}H_{27}O(CH_2CH_2O)_{7-8}H$, $C_{13}H_{27}$ group from $C_{13}$ "Oxo" alcohol.
[d] 40% Aqueous solution of

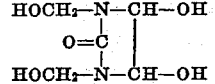

[e] Softener, a cationic fatty amide derivative (Ceramine HC— Sandoz, Inc.).

The composition of the baths, other than as specified above, is as follows:

| Bath No. | Dispersant, percent OWF | Example 6 emulsion No. | Concentration, percent OWF |
|---|---|---|---|
| 1* | 0.035 | 14 | 1.5 |
| 2* | 0.045 | 14 | 2.5 |
| 3* | 0.035 | 15 | 1.5 |
| 4* | 0.045 | 15 | 2.5 |
| 5 | 0.035 | 16 | 1.5 |
| 6 | 0.045 | 16 | 2.5 |
| 7 | 0.035 | 17 | 1.5 |
| 8 | 0.045 | 17 | 2.5 |

*Represents pad baths containing a polymeric composition of this invention.

These baths are primarily for use in obtaining the so-called permanent press garments. Samples of Fabric 112 and 407 cotton poplin (described in Example 7) were treated with the baths to obtain about 50% wet pickup, air dried and cured at 350° F. for 15 minutes. In addition to evaluation initially and after three standard washings (3SL) the samples were also evaluated in the

| | Fabric 112 | | | | | | 407 Poplin Fabric | | | | | |
|---|---|---|---|---|---|---|---|---|---|---|---|---|
| | Initial | | 3SW | | 1DC | | Initial | | 3SW | | 1DC | |
| Bath No. | Oil | Water | Oil | Water | Oil | Water | Oil | Water | Oil | Water | Oil | Water |
| 1* | 3 | 80 | 2 | 80 | 3 | 70 | 2 | 80- | 2 | 80- | 3 | 70 |
| 2* | 4 | 80 | 4 | 80 | 4 | 70 | 4 | 80 | 4 | 80 | 4 | 70 |
| 3* | 4 | 80 | 4 | 80- | 4 | 70 | | | | | | |
| 4* | 5 | 80 | 4 | 80- | 7 | 70 | | | | | | |
| 5 | 0 | 80 | 0 | 80 | 0 | 50 | 0 | 80- | 0 | 70 | 0 | 50 |
| 6 | 0 | 80 | 0 | 80 | 0 | 70 | 0 | 80- | 0 | 70 | 0 | 50 |
| 7 | 0 | 80 | 0 | 80 | 0 | 70 | 0 | 70 | 0 | 80- | 2 | 70 |
| 8 | 0 | 80 | 0 | 80- | 2 | 70 | 0 | 90 | 2 | 80- | 3 | 70 |
| 9* | 2 | 80 | 0 | 80 | 2 | 70 | 3 | 80 | 3 | 70 | 4 | 70 |
| 10* | 3 | 80 | 2 | 80 | 5 | 70 | 4 | 80 | 4 | 80 | 5 | 70 |
| 11 | 0 | 80 | 0 | 80 | 0 | 70 | 0 | 80 | 0 | 70 | 0 | 0 |
| 12 | 0 | 80 | 0 | 80 | 0 | 70 | 0 | 80 | 0 | 70 | 0 | 50 |
| 13 | 0 | 80 | 0 | 70 | 0 | 50 | 0 | 80 | 0 | 80- | 2 | 70 |
| 14 | 0 | 80- | 0 | 70 | 0 | 70 | 2 | 80 | 4 | 80 | 3 | 70 |
| 15* | 4 | 80 | 4 | 80 | 2 | 70 | 4 | 80 | 4 | 80- | 4 | 80 |
| 16* | 4 | 80 | 5 | 80 | 4 | 70 | 5 | 80- | 4 | 70 | 0 | 50 |
| 17 | 0 | 80 | 0 | 80 | 0 | 70 | 0 | 80- | 0 | 70 | 0 | 70 |
| 18 | 0 | 80 | 0 | 80 | 0 | 70 | 0 | 70 | 0 | 70 | 2 | 70 |
| 19 | 0 | 80 | 0 | 80 | 0 | 70 | 0 | 70 | 0 | 70 | 3 | 70 |
| 20 | 2 | 80 | 3 | 80- | 2 | 70 | 2 | 70 | 2 | 70 | 3 | 70 |
| 21* | 2 | 80 | 2 | 80- | 2 | 70 | 4 | 80 | 3 | 80- | 2 | 70 |
| 22* | 4 | 80 | 4 | 80 | 4 | 70 | 4 | 80 | 4 | 80- | 4 | 70 |
| 23 | 0 | 80 | 0 | 80 | 0 | 50 | 0 | 80- | 0 | 70 | 0 | 50 |
| 24 | 0 | 80 | 0 | 80 | 0 | 70 | 0 | 80- | 0 | 70 | 0 | 50 |
| 25 | 0 | 80 | 0 | 80- | 0 | 70 | 2 | 80 | 0 | 70 | 0 | 70 |
| 26 | 3 | 80- | 3 | 80- | 2 | 70 | 3 | 80 | 2 | 70 | 3 | 70 |

*Represents results obtained from a pad bath mixture containing a polymeric composition of this invention.

home wash-air dry (HWAD), home wash-tumble dry (HWTD) (156° F.) tests. The home laundering test consists of washing in a commercially available automatic home washing machine with a four pound load and 29 g. of "Tide" with the machine set at hot (12 min. cycle) and a warm rinse (12 min.) total time 40 minutes. In the air dry, the washed fabric, the spun dried fabric is hung to dry at ambient temperature. In the tumble dry test, the spun dry fabric is dried at 156–160° F. in a home drier with tumbling. The dry cleaning test described in Example 7 was modified (MDC) in that the fabrics were dried at 66° C. for three minutes in a drum followed by a 15 second press on each side at 149° C. The results are shown below.

The bath compositions, other than as specified above, are as follows:

| Bath No. | Dispersant, percent OWF | Example 6 emulsion No. | Concentration, OWF |
|---|---|---|---|
| 1* | 0.035 | 14 | 1.5 |
| 2* | 0.045 | 14 | 2.5 |
| 3* | 0.035 | 15 | 1.5 |
| 4* | 0.045 | 15 | 2.5 |
| 5 | 0.035 | 16 | 1.5 |
| 6 | 0.045 | 16 | 2.5 |
| 7 | 0.035 | 17 | 1.5 |
| 8 | 0.045 | 17 | 2.5 |

* Represents pad baths containing polymeric compositions of this invention.

REPELLENCIES

| Bath No. | Initial | | 3SL | | 1HWAD | | 1HWTD | | 1MDC | |
|---|---|---|---|---|---|---|---|---|---|---|
| | Oil | Water | Oil | Water | Oil | Water | Oil | Water | Oil | Water |
| Fabric 112: | | | | | | | | | | |
| 1* | 3 | 70 | 3 | 70 | 0 | 70 | 2 | 70 | 3 | 70 |
| 2* | 4 | 80 | 4 | 70 | 0 | 70 | 4 | 70 | 4 | 70 |
| 3* | 0 | 70 | 0 | 70 | 0 | 70 | 0 | 70 | 2 | 70 |
| 4* | 2 | 80− | 2 | 80− | 0 | 70 | 0 | 70 | 0 | 50 |
| 5 | 0 | 70 | 0 | 70 | 0 | 70 | 0 | 70 | 0 | 50 |
| 6 | 0 | 70 | 0 | 70 | 0 | 70 | 0 | 70 | 0 | 70 |
| 7 | 0 | 70 | 0 | 70 | 0 | 70− | 0 | 70 | 0 | 70 |
| 8 | | | | | | | | | | |
| 407 poplin: | | | | | | | | | | |
| 1* | 3 | 80 | 3 | 80− | 2 | 70 | 2 | 80− | 4 | 70 |
| 2* | 4 | 80− | 4 | 70 | 3 | 70 | 4 | 70 | 5 | 70 |
| 3* | | | | | | | | | | |
| 4* | | | | | | | | | | 50 |
| 5 | 0 | 80− | 0 | 70 | 0 | 70 | 0 | 70 | 0 | 50 |
| 6 | 0 | 70 | 0 | 70 | 0 | 70 | 0 | 70 | 0 | 70 |
| 7 | 0 | 70 | 0 | 70 | 0 | 70 | 0 | 70 | 0 | 70 |
| 8 | 0 | 70 | 0 | 70 | 0 | 70 | 0 | 70 | | |

* Represents results obtained from a pad bath mixture containing a polymeric composition of this invention.

EXAMPLE 10

Pad baths were made up having the following compositions shown below, based on weight of fabric (OWF) to which they were to be applied.

| Component: | Percent OWF |
|---|---|
| Water repellent a | 0.8 |
| Dispersant b | As indicated. |
| Surfactant c | 0.03 |
| Isopropyl alcohol | 2.0. |
| Permanent press resin d | 12.0. |
| Softener e | 0.25. |
| 27% zinc nitrate solution | 2.5. |
| Example 6 emulsion | As indicated. | a As described in Example 8.
b As described in Example 7.
c,d,e As described in Example 9.

These baths were applied to Fabric 112 and 407 poplin and the resulting fabrics tested as in Example 9. The results are shown below.

REPELLENCIES

| Bath No. | Initial | | 3SL | | 1HWAD | | 1HWTD | | 1MDC | |
|---|---|---|---|---|---|---|---|---|---|---|
| | Oil | Water | Oil | Water | Oil | Water | Oil | Water | Oil | Water |
| Fabric 112: | | | | | | | | | | |
| 1* | 3 | 80 | 4 | 80− | 0 | 80− | 3 | 80− | 3 | 50 |
| 2* | 4 | 80− | 4 | 80− | 0 | 70 | 4 | 70 | 3 | 70 |
| 3* | 3 | 80− | 2 | 70 | 0 | 70 | 0 | 70 | 3 | 70 |
| 4* | 4 | 80− | 4 | 80− | 3 | 70 | 4 | 80− | 4 | 80− |
| 5 | 0 | 80− | 0 | 70 | 0 | 80− | 0 | 80− | 0 | 50 |
| 6 | 0 | 80− | 0 | 70 | 0 | 70 | 0 | 70 | 0 | 50 |
| 7 | 0 | 80− | 0 | 70 | 0 | 70 | 0 | 70 | 0 | 50 |
| 8 | 2 | 80− | 0 | 70 | 0 | 70 | 0 | 70 | 2 | 50 |
| 407 poplin: | | | | | | | | | | |
| 1* | 4 | 80 | 2 | 80− | 0 | 70 | 4 | 80− | 2 | 50 |
| 2* | 4 | 80 | 4 | 70 | 2 | 70 | 4 | 70 | 3 | 50 |
| 3* | | | | | | | | | | |
| 4* | | | | | | | | | | 50 |
| 5 | 0 | 80− | 0 | 80− | 0 | 70 | 0 | 70 | 0 | 50 |
| 6 | 0 | 70 | 0 | 70 | 0 | 70 | 0 | 70 | 0 | 50 |
| 7 | 0 | 80 | 0 | 80 | 0 | 70 | 0 | 70 | 0 | 50 |
| 8 | 2 | 80 | 2 | 70 | 0 | 70− | 0 | 70 | 3 | 50 |

* Represents results obtained from pad baths containing polymeric compositions of this invention.

EXAMPLE 11

Pad baths were prepared containing 2.0% OWF of the polymers of Example 2. These were applied to Fabric 112 in the manner previously described, cured and evaluated for oil and water rtpellency with the results shown below.

| Polymer of Example 2 containing monomer No. | Repellencies, initial | |
|---|---|---|
| | Oil | Water |
| II* | 4 | 80 |
| I* | 4 | 70 |
| V* | 3 | 80 |
| III | 1 | 70 |
| IV | 1 | 70 |

* Represents polymers of this invention.

EXAMPLE 12

A solution of 19.1 parts n-C$_3$F$_7$OCF(CF$_3$)CF$_2$OCF(CF$_3$)CH$_2$OH in 50 parts ethylene glycol dimethyl ether was added slowly at 5° C. to 1.62 parts potassium metal under a nitrogen atmosphere. After addition was complete, the mixture was carefully warmed to 60-70° C. and maintained for 2.5 hours. Then 4.39 parts methacryloyl chloride in 50 parts ethylene glycol dimethyl ether was added slowly over a 4-hour period. After agitating overnight, 15 parts isopropanol were added to decompose any unreacted potassium.

EXAMPLE 13

A solution of 132.2 parts n-C$_3$F$_7$O[CF(CF$_3$)CF$_2$O]$_2$CF(CF$_3$)CH$_2$OH in 300 parts ethylene glycol dimethyl ether was cooled to 0° C. To this were added simultaneously at 0° C. a solution of 23.4 parts methacryloyl chloride in about 27 parts diethylene glycol dimethyl ether and a solution of 22.7 parts triethylamine in 28 parts of the same ether, over a two-hour period. After standing for six hours at 0° C. and then eight hours at room temperature, the solids were removed by filtration. Fractional distillation of the filtrate gave the ester n-C$_3$F$_7$O[CF(CF$_3$)CF$_2$O]$_2$CF(CF$_3$)

CH$_2$O$_2$CC(CH$_3$)=CH$_2$

EXAMPLE 14

A mixture containing 11 parts water, 0.187 part dimethyloctadecylamine, 0.09 part acetic acid, 5 parts acetone and 3.88 parts of the ester of Example 13 was purged with nitrogen while held at 70° C. for 1.5 hours. After cooling to 60° C., 0.112 part n-butyl methacrylate, 0.08 part N-methylolacrylamide and 0.002 part azobis(isobutyramidine dihydrochloride) were added. The mixture was agitated for four hours at 60° C. The resulting latex contained 13.5% polymer solids.

A pad bath was prepared containing 4.0% on weight of fabric of the above polymer latex. This was applied to fabric and cured as described in Example 7. The oil and water repellency were evaluated using the tests of Example 7: oil repellency 6, water repellency 50.

The preceding representative examples may be varied within the scope of the present total specification disclosure, as understood and practiced by one skilled in the art, to achieve essentially the same results.

The foregoing detailed description has been given for clearness of understanding only and no unnecesary limitations are to be understood therefrom. The invention is not limited to the exact details shown and described, for obvious modifications will occur to those skilled in the art.

The embodiments of the invention in which an exclusive property or privilege is claimed are defined as follows:

1. An ester having the structural formula $$CF_3CF_2CF_2O\left(\begin{array}{c}CF_3\\|\\CFCF_2O\end{array}\right)_n\begin{array}{c}CF_3\\|\\CFCH_2O_2CR=CH_2\end{array}$$

wherein R is hydrogen or methyl and $n$ is the integer 1 or 2.

2. An ester of claim 1 wherein $n$ is 2 and R is methyl.
3. An ester of claim 1 wherein $n$ is 1 and R is methyl.
4. A polymer consisting essentially of units derived from an ester of claim 1.
5. A polymer consisting essentially of units derived from the ester of claim 2.

References Cited
UNITED STATES PATENTS

| | | | |
|---|---|---|---|
| 2,811,501 | 10/1957 | Stedry | 260—89.5H |
| 2,826,564 | 3/1958 | Bovey et al. | 260—486H |
| 2,839,513 | 6/1958 | Ahlbrecht et al. | 260—486H |
| 3,201,445 | 8/1965 | Drysdale et al. | 260—461 |
| 3,385,882 | 5/1968 | Tullio | 260—485 |

HARRY WONG, JR., Primary Examiner

U.S. Cl. X.R.

117—124, 132, 139.5, 140, 145, 148, 155, 161; 260—63, 80.72, 80.73, 80.75, 80.81, 83.5, 85.5, 86.1, 86.3, 86.7, 486, 544, 823, 900